United States Patent
Mehta

(10) Patent No.: US 11,914,607 B2
(45) Date of Patent: *Feb. 27, 2024

(54) GENERIC DATA STAGING AND LOADING USING ENHANCED METADATA AND ASSOCIATED METHOD

(71) Applicant: Blue Yonder Group, Inc., Scottsdale, AZ (US)

(72) Inventor: Rubesh Mehta, Irving, TX (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 1196 days.

This patent is subject to a terminal disclaimer.

(21) Appl. No.: 16/544,323

(22) Filed: Aug. 19, 2019

(65) Prior Publication Data

US 2019/0370265 A1    Dec. 5, 2019

Related U.S. Application Data

(63) Continuation of application No. 12/056,555, filed on Mar. 27, 2008, now Pat. No. 10,387,440.

(60) Provisional application No. 60/908,731, filed on Mar. 29, 2007.

(51) Int. Cl.
    *G06F 16/25*    (2019.01)
(52) U.S. Cl.
    CPC .................................. *G06F 16/254* (2019.01)
(58) Field of Classification Search
    CPC ...................................................... G06F 16/254
    See application file for complete search history.

(56) References Cited

U.S. PATENT DOCUMENTS

| | | | |
|---|---|---|---|
| 5,706,494 A | 1/1998 | Cochrane et al. | |
| 6,167,405 A | 12/2000 | Rosensteel et al. | |
| 6,208,990 B1 | 3/2001 | Suresh et al. | |
| 6,339,775 B1 | 1/2002 | Zamanian et al. | |
| 6,959,326 B1 | 10/2005 | Day et al. | |
| 6,978,305 B1 | 12/2005 | Nainani et al. | |
| 7,051,334 B1 | 5/2006 | Porter et al. | |
| 7,058,615 B2 | 6/2006 | Yao | |
| 7,197,480 B1* | 3/2007 | Chollon | G06Q 40/12 705/26.61 |
| 7,213,037 B2 | 5/2007 | Rangadass | |

(Continued)

FOREIGN PATENT DOCUMENTS

TW    I347503    8/2011

OTHER PUBLICATIONS

Search Report for Taiwan Invention Patent Application No. 097111470; dated Aug. 29, 2014; p. 1.

(Continued)

*Primary Examiner* — Eliyah S. Harper
(74) *Attorney, Agent, or Firm* — Spencer Fane LLP; Steven J. Laureanti

(57) ABSTRACT

A system and method is disclosed for providing data staging and loading through a master data management (MDM) system coupled with one or more business entities. The system is operable to invoke batch data loading of data associated with one or more source systems associated with the one or more business entities, into an input staging area. The system is further operable to load the data from the input staging area into a master repository and subsequently load the data from the master repository into an output staging area.

20 Claims, 2 Drawing Sheets

(56) References Cited

U.S. PATENT DOCUMENTS

| | | | |
|---|---|---|---|
| 7,403,901 B1* | 7/2008 | Carley | G16Z 99/00 |
| | | | 705/2 |
| 7,571,166 B1* | 8/2009 | Davies | G06Q 10/087 |
| 7,577,672 B2 | 8/2009 | Guertler et al. | |
| 7,593,015 B2 | 9/2009 | Rao | |
| 7,657,540 B1* | 2/2010 | Bayliss | G06Q 10/10 |
| | | | 707/726 |
| 7,720,846 B1* | 5/2010 | Bayliss | G06F 16/285 |
| | | | 707/736 |
| 7,752,230 B2 | 7/2010 | Bland et al. | |
| 7,958,091 B2* | 6/2011 | Nair | G06F 16/2379 |
| | | | 718/101 |
| 8,037,408 B2 | 10/2011 | Hartmann | |
| 8,061,604 B1 | 11/2011 | Wobbe et al. | |
| 8,606,723 B2* | 12/2013 | Seubert | G06Q 30/04 |
| | | | 705/26.1 |
| 8,694,397 B2* | 4/2014 | Seubert | G06Q 10/06 |
| | | | 705/35 |
| 2003/0115080 A1 | 6/2003 | Kasravi et al. | |
| 2004/0122699 A1 | 6/2004 | Brito et al. | |
| 2004/0194009 A1 | 9/2004 | LaComb et al. | |
| 2005/0171746 A1 | 8/2005 | Thalhammer-Reyero | |
| 2006/0112123 A1 | 5/2006 | Clark et al. | |
| 2006/0235831 A1 | 10/2006 | Adinolfi et al. | |
| 2007/0016639 A1* | 1/2007 | Mukundan | G06Q 10/06 |
| | | | 709/203 |
| 2007/0214179 A1 | 9/2007 | Hoang | |
| 2007/0226168 A1* | 9/2007 | Mukundan | G06F 9/547 |
| 2007/0226709 A1* | 9/2007 | Coker | G06F 8/36 |
| | | | 717/140 |
| 2007/0250840 A1* | 10/2007 | Coker | G06F 9/54 |
| | | | 719/320 |
| 2009/0215033 A1* | 8/2009 | Khan | C12Q 1/6886 |
| | | | 536/23.1 |
| 2010/0287458 A1* | 11/2010 | Guller | G06Q 20/10 |
| | | | 715/205 |

OTHER PUBLICATIONS

Erhard Rahm and Hong Hai Do, "Data Cleaning: Problems and Current Approaches", Bulletin of the IEEE Computer Society Technical Committee on Data Engineering, 2000, pp. 3-13.

Arun Sen and Atish P. Sinha, "A Comparison of Data Warehouseing Methodologies", Communications of the AMC, Mar. 2005, vol. 48, No. 3, pp. 79-84.

* cited by examiner

GENERIC DATA STAGING AND LOADING
USING ENHANCED METADATA AND
ASSOCIATED METHOD

CROSS-REFERENCE TO RELATED
APPLICATIONS

This application is a continuation of U.S. patent application Ser. No. 12/056,555, filed on Mar. 27, 2008, entitled "Generic Data Staging and Loading Using Enhanced Metadata and Associated Method," which claims the benefit under 35 U.S.C. § 119(e) to U.S. Provisional Application No. 60/908,731, filed Mar. 29, 2007, and entitled "Generic Data Staging and Loading Using Enhanced Metadata and Associated Method." U.S. patent application Ser. No. 12/056,555 and U.S. Provisional Application No. 60/908,731 are assigned to the assignee of the present application. The subject matter disclosed in U.S. patent application Ser. No. 12/056,555 and U.S. Provisional Application No. 60/908,731 is hereby incorporated by reference into the present disclosure as if fully set forth herein.

TECHNICAL FIELD

The present disclosure relates generally to data staging with associated batch data loading and, more specifically, to generic data staging and loading using enhanced metadata.

BACKGROUND

In many enterprise environments, data is generated and contained in various systems within the enterprise. However, in order to enable analysis, management, and planning of the data, the enterprise must combine the data into cohesive models, in a staging area, where the enterprise can validate, cleanse, correlate, and format the data, in order to pass it on to downstream consumers, such as, for example, data warehouses, planning engines, and the like.

Traditionally, the enterprise implemented a process based on a project by project basis, that is, a process that utilized a custom approach to create staging models and tables, load data using Extract, Transform, and Load (ETL) tools, and write custom scripts in order to validate and cleanse this data. However, this traditional process has proved disadvantageous, since, for example, the traditional ETL tools are limited in their capabilities and the custom scripts are seldom reusable and are typically difficult to maintain. The limited capabilities of ETL tools and the inability to reuse custom scripts are undesirable.

SUMMARY

A system for providing data staging and loading through a master data management system coupled with one or more business entities is disclosed. The system is operable to invoke batch data loading of data associated with one or more source systems associated with the one or more business entities, into an input staging area. The system is further operable to load the data from the input staging area into a master repository and load the data from the master repository into an output staging area.

A method for data staging and loading through a master data management system is disclosed. The method includes invoking batch data loading of data associated with one or more source systems into an input staging area. The method further includes loading the data from the input staging area into a master repository and loading the data from the master repository into an output staging area.

Software for data staging and loading through a master data management system is disclosed. The software is embodied in a computer-readable media and when executed, the software is operable to invoke batch data loading of data associated with one or more source systems into an input staging area. The software is further operable to load the data from the input staging area into a master repository and load the data from the master repository into an output staging area.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Reference will now be made to the following detailed description of the preferred and alternate embodiments of the present invention. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
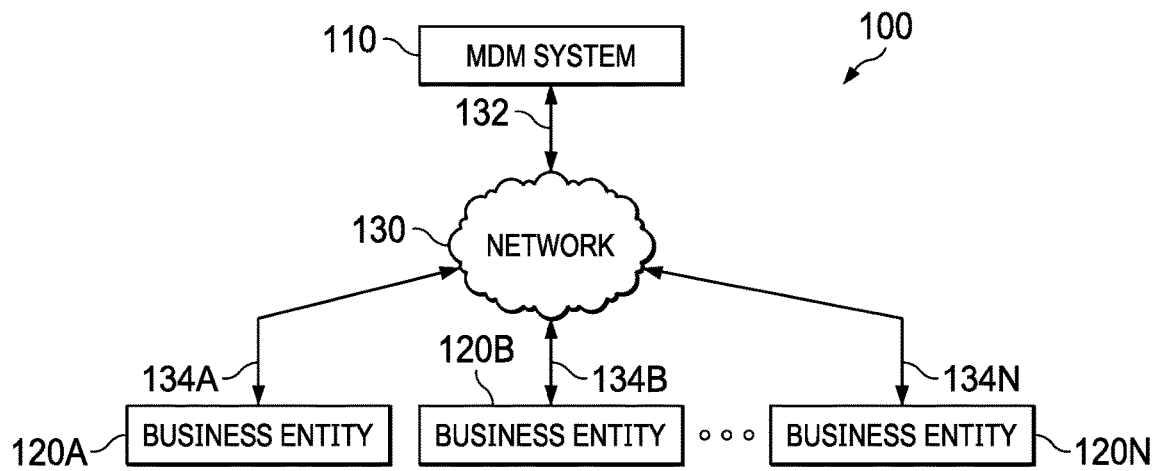
FIG. 1 illustrates an exemplary system according to a preferred embodiment.

FIG. 1 illustrates an exemplary system 100 according to a preferred embodiment. System 100 comprises a master data management (MDM) system 110, one or more business entities 120a-120n, a network 130, and communication links 132 and 134a-134n. Although a single MDM system 110, one or more business entities 120a-120n, and a single network 130, are shown and described; embodiments contemplate any number of MDM systems 110, any number of business entities 120a-120n, and/or any number of networks 130, according to particular needs. In addition, or as an alternative, MDM system 110 may be integral to or separate from the hardware and/or software of any one of the one or more business entities 120a-120n.

In one embodiment, system 100 may provide an input staging area, unify the data in the input staging area, load the data from the input staging area into a master repository, load the data from the master repository into an output staging area, and subsequently load the data from the output staging area, into one or more target systems. In addition, or as an alternative, system 100 may utilize the metadata about one or more source systems (i.e., one or more business entities 120a-120n) to recommend staging and master interfaces and/or relational table structures using semantic mapping metadata. In essence, this loading process provides for the ability of an automatic and rule based approach to reconcile the data in the input staging area and flag any exceptions with respect to any mismatches. In addition, the loading process provides a unique approach, such that the data in the input staging area may be validated, consolidated, profiled, monitored for quality and subsequently loaded into the master repository.

System 100 may operate on one or more computers that may be integral to or separate from the hardware and/or software that support MDM system 110 and one or more business entities 120a-120n. These one or more computers may include any suitable input device, such as a keypad, mouse, touch screen, microphone, or other device to input information. In addition, these one or more computers may include any suitable output device that may convey information associated with the operation of system 100, including digital or analog data, visual information, or audio information. Furthermore, these one or more computers may include fixed or removable storage media, such as magnetic computer disks, CD-ROM, or other suitable media to receive output from and provide input to system 100. In addition, these one or more computers may include one or more processors and associated memory to execute instructions and manipulate information according to the operation of system 100.

In addition, or as an alternative, MDM system 110 and one or more business entities 120a-120n may each operate on one or more separate computers or may operate on one or more shared computers. Each of these one or more computers may be a work station, personal computer (PC), network computer, personal digital assistant (PDA), wireless data port, or any other suitable computing device. In another embodiment, one or more users may be associated with MDM system 110 and/or one or more business entities 120a-120n. These one or more users may include, for example, a "planner" handling planning and/or one or more related tasks within system 100. In addition, or as an alternative, these one or more users within system 100 may include, for example, one or more computers programmed to autonomously handle planning and/or one or more related tasks within system 100.

In one embodiment, MDM system 110 is coupled to network 130 using communications link 132, which may be any wireline, wireless, or other link suitable to support data communications between MDM system 110 and network 130 during operation of system 100. One or more business entities 120a-120n may be coupled to network 130 using communications links 134a-134n, which may be any wireline, wireless, or other link suitable to support data communications between one or more business entities 120a-120n and network 130 during operation of system 100. Although communication links 132 and 134a-134n are shown as generally coupling MDM system 110 and one or more business entities 120a-120n to network 130, MDM system 110 and one or more business entities 120a-120n may communicate directly with each other, according to particular needs.

In another embodiment, network 130 includes the Internet and any appropriate local area networks (LANs), metropolitan area networks (MANS), or wide area networks (WANs) coupling MDM system 110 and one or more business entities 120a-120n. For example, data may be maintained by MDM system 110 at one or more locations external to MDM system 110 and one or more business entities 120a-120n and made available to one or more associated users of one or more business entities 120a-120n using network 130 or in any other appropriate manner. Those skilled in the art will recognize that the complete structure and operation of communication network 130 and other components within system 100 are not depicted or described. Embodiments may be employed in conjunction with known communications networks and other components.

Figure 2:
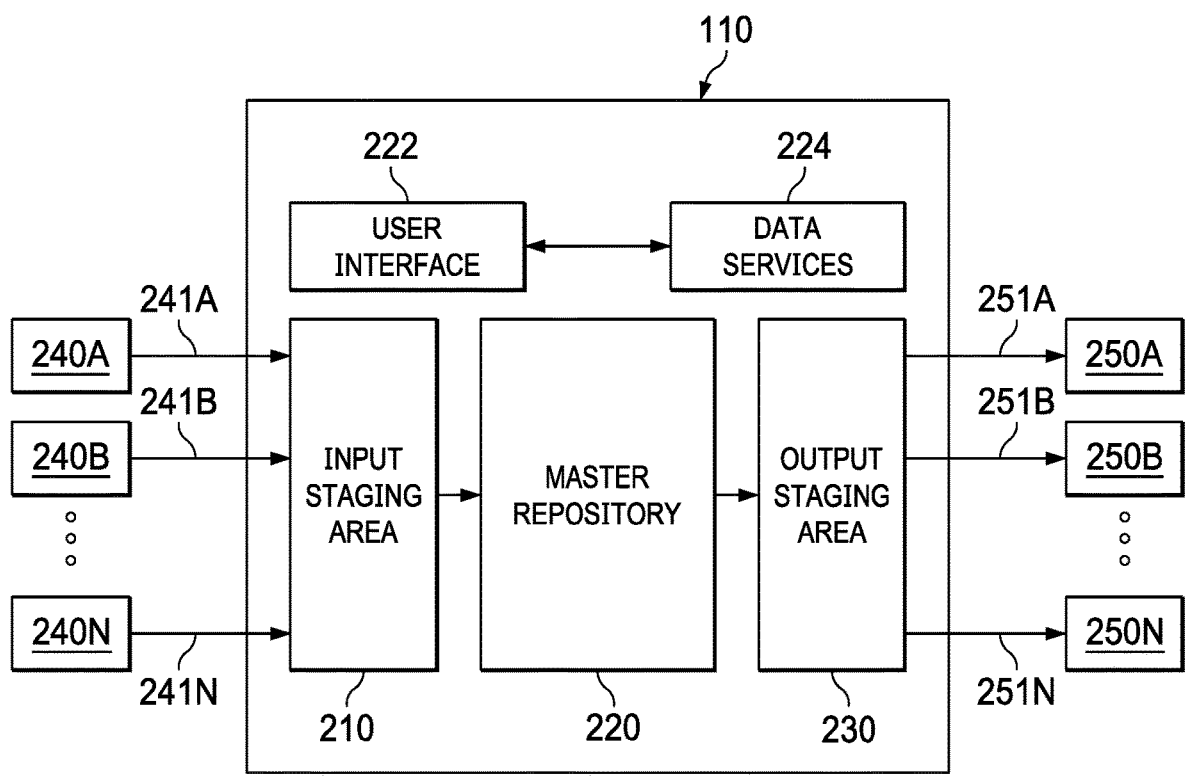
FIG. 2 illustrates the MDM system of FIG. 1 in greater detail in accordance with the preferred embodiment.

FIG. 2 illustrates MDM system 110 of FIG. 1 in greater detail in accordance with the preferred embodiment. MDM system 110 comprises an input staging area 210, a master repository 220, and an output staging area 230. MDM system 110 comprises one or more computers at one or more locations including user interface 221. In addition, as discussed above, the one or more computers associated with MDM system 110 may include input devices, output devices, mass storage media, processors, memory, or other components for receiving, processing, storing, and communicating information according to the operation of system 100.

MDM system 110 also comprises data services 224, wherein a service in data services 224 is defined with an associated model. In addition, MDM system 110 may generate an associated input staging service, a master service, and an output staging service. Each of the services in data services 224 may include an associated set of data models and/or data tables. In addition, each of the services in data services 224 may also define a workflow, that is, data services 224 may define rules that take a request, such as, for example, an XML based data request, and generate and/or process an appropriate response.

In one embodiment, one or more source systems 240a-240n may be coupled with input staging area 210 of MDM system 110 using communications links 241a-241n, which may be any wireline, wireless, or other link suitable to support data communications between one or more source systems 240a-240n and MDM system 110 during operation of system 100. Output staging area 230 of MDM system 110 may be coupled with one or more target systems 250a-250n using communications links 251a-251n, which may be any wireline, wireless, or other link suitable to support data communications between MDM system 110 and one or more target systems 250a-250n during operation of system 100. Although communication links 241a-241n and 251a-251n are shown as generally coupling one or more source systems 240a-240n and one or more target systems 250a-250n to MDM system 110, one or more source systems 240a-240n, one or more target systems 250a-250n, and MDM system 110 may communicate through network 130 and/or directly with each other, according to particular needs.

In another embodiment, one or more source systems 240a-240n may include one or more business entities 120a-120n and/or one or more business units within one or more business entities 120a-120n. As an example only and not by way of limitation, these one or more source systems 240a-240n may include one or more business units of one or more business entities 120a-120n associated with a particular geographical location, a particular product mix, and/or a particular business operation. In addition, or as an alternative, one or more target systems 250a-250n may include one or more business entities 120a-120n. As an example only and not by way of limitation, these one or more business entities 120a-120n may include data warehouses, analysis and planning engines, and/or any other planning related process within system 100. Although one or more source systems 240a-240n and one or more target systems 250a-250n are described as associated with particular business entities, one or more source systems 240a-240n and/or one or more target systems 250a-250n may be associated with any number and/or type of business entities.

In one embodiment, MDM system 110 may provide for MDM batch data loading of data associated with one or more source systems 240a-240n into input staging area 210. In addition, or as an alternative, the MDM batch data loading may be fed in bulk mode as a file, such as for example, via ETL. In addition, MDM system 110 may provide for a relational input staging interface in input staging area 210, such that, data is loaded from one or more source systems 240a-240n through the relational input staging interface. For example, data may be loaded from one or more source systems 240a-240n into an unconstrained area of input staging area 210. Among other things, this provides for faster data loads, than prior art systems without a relational input staging interface, and minimizes any effect on one or more source systems 240a-240n, during the MDM batch data loading. As another example only and not by way of limitation, the data loads may be loaded into input staging area 210 via a structured query language (SQL) Loader, ETL Tool, shell/perl scripts, or any other suitable loader. The MDM batch data loading provides MDM system 110 with the ability to validate, trap errors, clean errors in input staging area 210 and then subsequently load the data into a master repository 220. In addition, the batch data loading framework may provide the ability to plug in and/or disable any business validations, according to particular needs.

In another embodiment, MDM system 110 may model the MDM batch data loading as a workflow such that, for example, the MDM batch data loading may be configured to run automatically and customized for each data load associated with one or more source systems 240a-240n. In addition, the process may be completely automated or partially automated with the assistance of user intervention, through, for example, user interface 222. For example, if the workflow needs to progress with clean data or if there are errors in the data that need to be fixed and/or rectified in input staging area 210, prior to completing the process, user intervention, through, for example, user interface 222 may be necessary. User intervention may comprise the use of user interface 222 coupled with the one or more computers associated with MDM system 110. In this manner, a user associated with, for example, one or more business entities 120a-120n may fix and/or rectify any errors in the one or more source systems 240a-240n and than reload the data. Among other things, the user intervention ensures that future cleansing may not be necessary.

To further explain the operation of the MDM system 110, an example is now given. In the following example, one or more business entities 120a-120n invoke a scheduling tool to initiate bulk data loading from one or more source systems 240a-240n into input staging area 210. For example, during a predetermined time schedule, such as during the nighttime, one or more business entities 120a-120n may invoke a planning process by populating the relevant batch data needed for the planning engines. This batch data may be used to drive the planning runs and the results of which may be used, for example, to determine how one or more business entities 120a-120n should load its trucks in the morning, how one or more business entities 120a-120n should start their machines the next day, how much raw material should one or more business entities 120a-120n push through the system, and/or other like planning processes.

Once the data loading to input staging area 210 is complete, MDM system 110 invokes one or more workflows, as discussed below in more detail, such that the data is validated, consolidated, profiled, monitored for quality and subsequently loaded into master repository 220. In addition, MDM system 110 loads the processed data into output staging area 230 and subsequently to one or more target systems 250a-250n. After the bulk data loading is complete, which in our example, may be the next morning, MDM system 110 provides an error summary for the one or more users associated with MDM system 110 and/or one or more business entities 120a-120n. This error summary may provide information on the particular loads that happened during the night, in our example, including the quality of the data that was loaded from one or more source systems 240a-240n and/or any errors associated with the data loading that may have occurred. Although, the operation of the MDM system 110 is described as comprising an exemplary process, embodiments contemplate any suitable process or combination of processes, according to particular needs.

Figure 3:
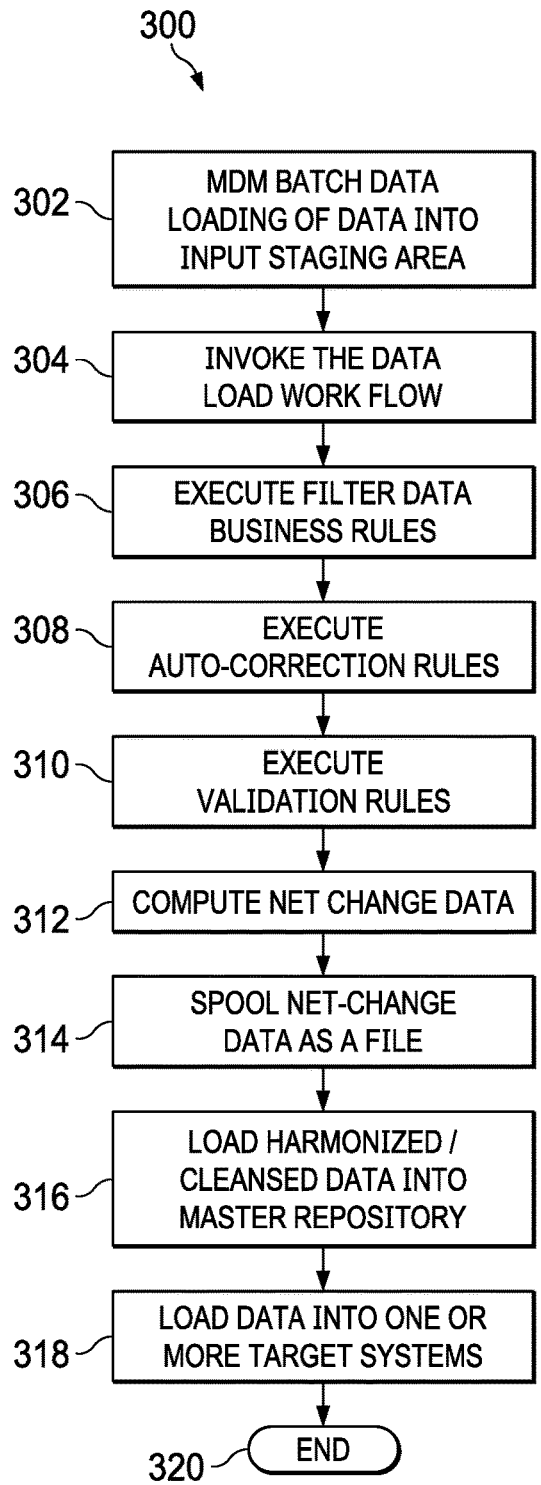
FIG. 3 illustrates an exemplary method for data loading using the MDM system of FIG. 1.

FIG. 3 illustrates an exemplary method 300 for data loading using MDM system 110. The method begins at step 302, where, as discussed above, MDM batch data loading is performed on data associated with one or more source systems 240a-240n, such that data associated with one or more source systems 240a-240n is loaded into input staging area 210.

At step 304, MDM system 110 invokes a data load workflow for processing the data loaded into input staging area 210. The process provides for validation, cleansing, filtering and routing of appropriate data to a master service. At step 306, the data load workflow executes filter data business rules, which may perform bulk operations as structured query language, which may be for example, implemented as a stored procedure. In addition, the filter data business rules may be defined for each of the one or more source systems 240a-240n, wherein the filter data business rules capture the expression for filtering the data for each of the one or more source systems 240a-240n. For example, any data loaded into input staging area 210 that satisfies the filter data business rules may be removed from input staging area 210 and moved into a temporary data table associated with input staging area 210.

Next at step 308, the data load workflow executes auto-correction rules, which may perform bulk operations as structured query language, which may be, for example, implemented as a stored procedure. The auto-correction rules may provide update rules which may be preprocessing rules that may be applied on data loaded into input staging area 210. These update rules may provide for pre-processing and/or auto-fills which may be performed before the data is validated and uploaded into master repository 220.

At step 310, the data load workflow executes validation rules, wherein database constraints are enabled. For example, any errors detected may be moved into a corresponding error table associated with input staging area 210. In addition, the validation rules provide an ability to capture rules as structured query language, i.e., where clause expressions, which may specify, which records may not be valid. For example, the validation rules evaluate the expression and may move the associated error records to particular error tables associated with input staging area 210.

At step 312, the data load workflow computes the net change, that is, the data load workflow compares the data in input staging area 210 with reference data, in for example, master tables and writes the net change data in a corresponding net change table associated with input staging area 210.

At step 314, a spooler within the data load workflow utilizes the net change data, in the net change tables, and spools the net change data as a file, such as, for example, a flat file. The spooler uploads the incremental net change data into master repository 220 via an application layer, by invoking the relevant application programming interface (API) configured for the incremental net change data. The spooler invokes a data upload service which serializes this data into a XML format and invokes the corresponding API. Embodiments of the present invention may provide for batch data to be added to master repository 220 via the same API and workflow as the data input via user interface 222, thereby ensuring integrity and security of the data.

Embodiments of the present invention also provide for an event node, such that waits on the asynchronous upload process to complete. The data load workflow may wait on this event node until the upload process completes. The data upload service may issue a callback when it has completed the upload. Embodiments of the present invention may generate an error summary. For example, since all types of errors have been trapped in particular error tables, the data load workflow may generate the error summary, such that, the summary table captures by data entity, such as, for example, one or more source systems 240a-240n, the count of the number of errors.

At step 316, MDM system 110 loads the harmonized/cleansed data into master repository 220 and at step 318, MDM system 110 loads the data into output staging area 230 and subsequently loads the data into one or more target systems 250a-250n, according to particular needs. Once the data is loaded into one or more target systems 250a-250n, the method ends at step 320.

Figure 4:
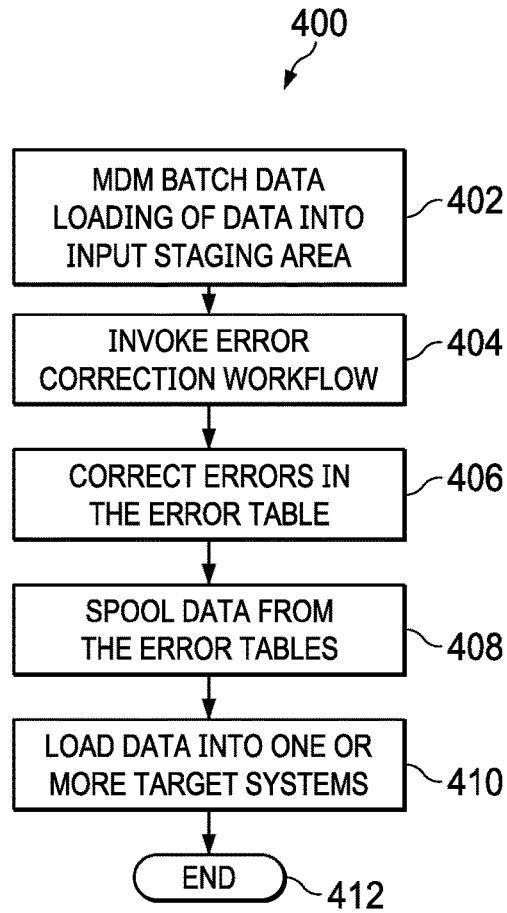
FIG. 4 illustrates an exemplary method for error correction using the MDM system of FIG. 1.

FIG. 4 illustrates an exemplary method 400 for error correction using MDM system 110. The method begins at step 402, where, as discussed above, MDM batch data loading is performed on data associated with one or more source systems 240a-240n, such that data associated with one or more source systems 240a-240n is loaded into input staging area 210.

At step 404, MDM system 110 invokes an error correction workflow, wherein the data may be corrected in input staging area 210 and resubmitted to be loaded into master repository 220. At step 406, a spooler within the error correction workflow provides for errors to be corrected in an error table, via, for example, error table editors and/or particular mass update operations. At step 408, the error correction workflow spools the data from the error tables and uploads it to master repository 220 via a data upload service. In addition, any errors that may occur again may be again created in the error table and on a successful insert; the errors may be removed from the error table.

Embodiments of the present invention also provide for an event node, such for waiting for the upload process to complete. The error correction workflow may wait on this persist net change node until the upload process is complete. The data upload service may issue a callback when it has completed the upload. Embodiments of the present invention may generate an error summary. For example, since all types of errors have been trapped in particular error tables, the error correction workflow may generate the error summary, such that, the error summary table captures by entity, i.e., one or more source systems 240a-240n, the count of the number of errors.

At step 410, MDM system 110 loads the data into master repository 220, than loads the data into output staging area 230, and subsequently loads the data into one or more target systems 250a-250n, according to particular needs. Once the data is loaded into one or more target systems 250a-250n, the method ends at step 412.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments of the present invention have been shown and described, it will be understood that various changes and modifications to the foregoing embodiments may become apparent to those skilled in the art without departing from the spirit and scope of the present invention. Accordingly, the invention is not limited to the embodiments disclosed, but rather by the appended claims and their equivalents.

What is claimed is:

1. A system to reduce data loading time from one or more source systems, minimize any effect on the one or more source systems during data loading, and correct any error in the data, comprising:
   a computer system comprising a processor and a memory, the computer system configured to:
      invoke batch data loading of data of one or more source systems into an unconstrained area of an input staging area to reduce data loading time from the one or more source systems and minimize any effect on the one or more source systems during data loading;
      automatically select one or more staging and master interfaces based on metadata of the one or more source systems;
      automatically select relational table structures based on semantic mapping metadata;
      evaluate the data loaded into the input staging area by an error correction workflow;
      move any error records into an error table;
      correct any error records in the error table by a spooler within the error correction workflow;
      load the data from the input staging area and corrected data from the error table into a master repository; and
      load the data from the master repository into an output staging area.

2. The system of claim 1, wherein the data of the one or more source systems is fed in bulk mode as a file into the input staging area.

3. The system of claim 1, wherein the input staging area comprises a relational input staging interface.

4. The system of claim 3, wherein the data of the one or more source systems is loaded into the input staging area through the relational input staging interface.

5. The system of claim 1, wherein the computer system models the batch data loading as a workflow.

6. The system of claim 1, wherein the computer system is further configured to:
   invoke a data load workflow for processing the data loaded into the input staging area.

7. The system of claim 6, wherein the data load workflow is configured to execute one or more filter data business rules on the data loaded into the input staging area.

8. A method to reduce data loading time from one or more source systems, minimize any effect on the one or more source systems during data loading, and correct any error in the data, comprising:
   invoking, by a processor of a computer system, batch data loading of data of one or more source systems into an unconstrained area of an input staging area to reduce data loading time from the one or more source systems and minimize any effect on the one or more source systems during data loading;
   automatically selecting, by the processor, one or more staging and master interfaces based on metadata of the one or more source systems;

automatically selecting, by the processor, relational table structures based on semantic mapping metadata;

evaluating, by the processor, the data loaded into the input staging area by an error correction workflow;

moving, by the processor, any error records into an error table;

correcting, by the processor, any error records in the error table by a spooler within the error correction workflow;

loading, by the processor, the data from the input staging area and corrected data from the error table into a master repository; and loading, by the processor, the data from the master repository into an output staging area.

9. The method of claim 8, wherein the data of the one or more source systems is fed in bulk mode as a file into the input staging area.

10. The method of claim 8, wherein the input staging area comprises a relational input staging interface.

11. The method of claim 10, wherein the data of the one or more source systems is loaded into the input staging area through the relational input staging interface.

12. The method of claim 8, wherein the computer system models the batch data loading as a workflow.

13. The method of claim 8, further comprising:
invoking a data load workflow for processing the data loaded into the input staging area.

14. A non-transitory computer-readable medium embodied with software to reduce data loading time from one or more source systems, minimize any effect on the one or more source systems during data loading, and correct any error in the data, the software when executed using one or more computers is configured to:

invoke batch data loading of data of one or more source systems into an unconstrained area of an input staging area of a computer system to reduce data loading time from the one or more source systems and minimize any effect on the one or more source systems during data loading;

automatically select one or more staging and master interfaces based on metadata of the one or more source systems;

automatically select relational table structures based on semantic mapping metadata;

evaluate the data loaded into the input staging area by an error correction workflow;

move any error records into an error table;

correct any error records in the error table by a spooler within the error correction workflow;

load the data from the input staging area and corrected data from the error table into a master repository; and load the data from the master repository into an output staging area.

15. The non-transitory computer-readable medium of claim 14, wherein the data of the one or more source systems is fed in bulk mode as a file into the input staging area.

16. The non-transitory computer-readable medium of claim 14, wherein the input staging area comprises a relational input staging interface.

17. The non-transitory computer-readable medium of claim 16, wherein the data of the one or more source systems is loaded into the input staging area through the relational input staging interface.

18. The non-transitory computer-readable medium of claim 14, wherein the computer system models the batch data loading as a workflow.

19. The non-transitory computer-readable medium of claim 14, wherein the software is further configured to:
invoke a data load workflow for processing the data loaded into the input staging area.

20. The non-transitory computer-readable medium of claim 19, wherein the data load workflow is configured to execute one or more filter data business rules on the data loaded into the input staging area.

* * * * *